Aug. 18, 1925.

H. A. SANGREN

SPRING GUARD

Filed Nov. 15, 1923

INVENTOR
*H. A. SANGREN.*
BY
*Harry H. Styll*
ATTORNEY

Patented Aug. 18, 1925.

1,550,572

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SPRING GUARD.

Application filed November 15, 1923. Serial No. 674,831.

*To all whom it may concern:*

Be it known that I, HARRY A. SANGREN, a citizen of the United States, residing at Southbridge, in the county of Worcester and State of Massachusetts, have invented certain new and useful Improvements in Spring Guards, of which the following is a specification.

The present invention relates to an improved spring guard, and has particular reference to a spring guard adapted for use upon the so-called zylonite frames.

An important object of the present invention is to provide a spring guard of this nature that may be used with an eyeglass mounting formed from a cellulose composition material, and will obviate the necessity of temples, thus forming a zylonite mounting that will give the appearance of a so-called fingerpiece eyeglass.

Another very important object of the invention is to provide a device of this nature that will allow of the placing of an eyeglass upon the nose, and which device will positively maintain the eyeglass in position at all times, obviating any possibility of accidental displacement.

Another very important object of the invention is to provide a device of this nature that will be so placed upon the mounting as to be inconspicuous and almost hidden from view.

Another important object of the invention is to provide a device of this nature which will be strong, durable, very simple of construction and manufacture, and which will be well adapted to the uses for which it is designed.

In the drawings, wherein like numerals are employed to designate like parts throughout the same:

Figure 1:
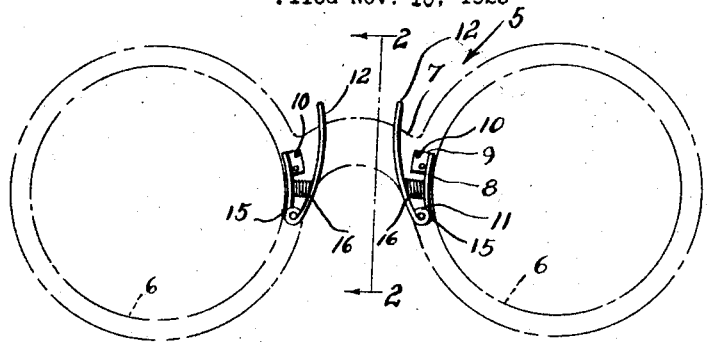
Figure 1 is a rear elevation of an eyeglass mounting showing my invention in position.
Figure 2:
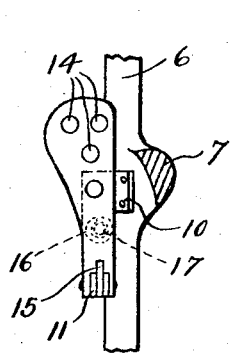
Figure 2 is a section taken on line 2—2 and looking in the direction of the arrow.

In the drawings, wherein for the purposes of illustration is shown the preferred embodiment of the invention, the numeral 5 designates the eyeglass mounting in its entirety, and comprises the eyes 6 and the bridge 7. My invention comprises a strip of metal 8 having the angular extension 9 at one end thereof, which angular extension is adapted to be placed upon the mounting at the junction of the bridge 7 with the eyes 6, as is clearly shown in Figure 1, and is put in place by suitable pins or the like 10. The strip 8 terminates in a hinge portion 11, to which is pivoted a slightly arcuated nose engaging portion 12. The nose engaging portion 12 may be of any desired shape and size, and I have illustrated the same as having a slightly bulged portion 13 to give more gripping space so as to prevent undue cutting of the nose. The arcuated nose engaging portion 12 may be punched in or struck as at 14 to form a better nose gripping surface.

Figure 3:
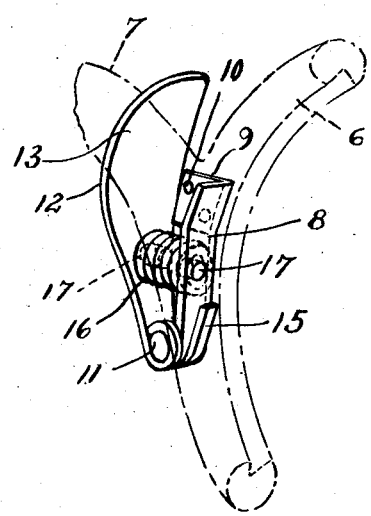
Figure 3 is a fragmentary perspective view of my invention.

The member 12 is provided with the angular extension 15, as is clearly shown in Figure 3, which is adapted to abut the outer face of the strip 8 so as to restrict the inward movement of the nose engaging member 12. A spring 16 is interposed between the strip 8 and the nose engaging member 12 so as to normally urge the member 12 inwardly to insure perfect contact with the nose of the wearer, thus preventing any accidental jarring off or tilting of the mounting when in use. In the present instance I have shown the coil spring 16 mounted upon the pins 17, but of course it will readily be understood that any form of spring may be interposed between the members 8 and 12, respectively.

In use it will be seen that the springs 16 will normally urge the nose engaging members 12 inwardly as far as the stops 15 will permit. When placing the mounting upon the nose, the nose engaging members 12 will be forced outwardly until the mounting is in the proper position, whereupon the spring 16 will force the nose engaging members 12 against the nose of the wearer to hold the same in place. If the portions 14 are provided a greater hold will be had, as will be readily understood. Of course, if it is desired a suitable covering, such as zylonite, may be placed on the nose engaging members 12.

It is to be understood that the form of my invention herewith shown and described is to be taken as the preferred embodiment of the same, and that various changes in the size, shape and arrangement of parts may be resorted to without departing from the spirit of the invention or the scope of the subjoined claims.

Having thus described my invention, I claim:

1. In combination with a non-metallic ophthalmic mounting, a nose guard comprising a bracket portion having a portion secured to the face of the mounting and a flange at an angle thereto, having a hinge member, a nose engaging portion hinged to the hinged member and extending upwardly and outwardly therefrom, and a spring between the nose engaging member and the hinge member flange.

2. In combination with a non-metallic ophthalmic mounting, a nose guard comprising a bracket portion secured to the face of the mounting and a flange at an angle thereto, having a hinge member, a nose engaging portion hinged to the hinge member and extending upwardly and outwardly therefrom, a spring between the nose engaging member and the hinge flange, and a stop on the nose engaging member adapted to contact with the hinge member flange and limit the outward movement of the nose engaging portion under the action of the spring.

3. In combination with a non-metallic ophthalmic mounting, a nose guard comprising a bracket portion having a portion secured to the face of the mounting and a flange at an angle thereto, having a hinge member, a nose engaging portion hinged to the hinge member and extending upwardly and outwardly therefrom, and a spiral spring between the nose engaging member and the hinge member flange intermediate of their ends.

4. In combination with a composition ophthalmic frame, a nose guard comprising a nose engaging member lying in a plane substantially normal to the plane of the face of the mounting, a bracket member having a flange, the plane of which is parallel to the plane of the nose engaging portion, a flange at an angle thereto secured to the face of the mounting, a hinge connection between the nose engaging portion and the flange of the bracket parallel thereto, and a spring between the two last named members.

5. In combination with a composition ophthalmic frame, a nose guard comprising a nose engaging member lying in a plane substantially normal to the plane of the face of the mounting, a bracket member having a flange, the plane of which is parallel to the plane of the nose engaging portion, a flange at an angle thereto secured to the mounting, a hinge connection between the nose engaging portion and the flange of the bracket parallel thereto, and a spiral spring between the two last named members.

6. In combination with a composition ophthalmic frame, a nose guard comprising a nose engaging member lying in a plane substantially normal to the plane of the face of the mounting, a bracket member having a flange, the plane of which is parallel to the plane of the nose engaging portion, a member at an angle thereto secured to the face of the mounting, a hinge connection between the lower end of the nose engaging portion and the flange of the bracket parallel thereto, a spiral spring between the two last named members and intermediate their ends, and a stop member on the nose engaging portion adapted to engage the flange member to limit its movement under the action of the spring.

HARRY A. SANGREN.